Feb. 16, 1943.          K. D. BOWEN                    2,311,181
              ROTAMETER CONSTRUCTION
                Filed Sept. 6, 1940            2 Sheets-Sheet 1
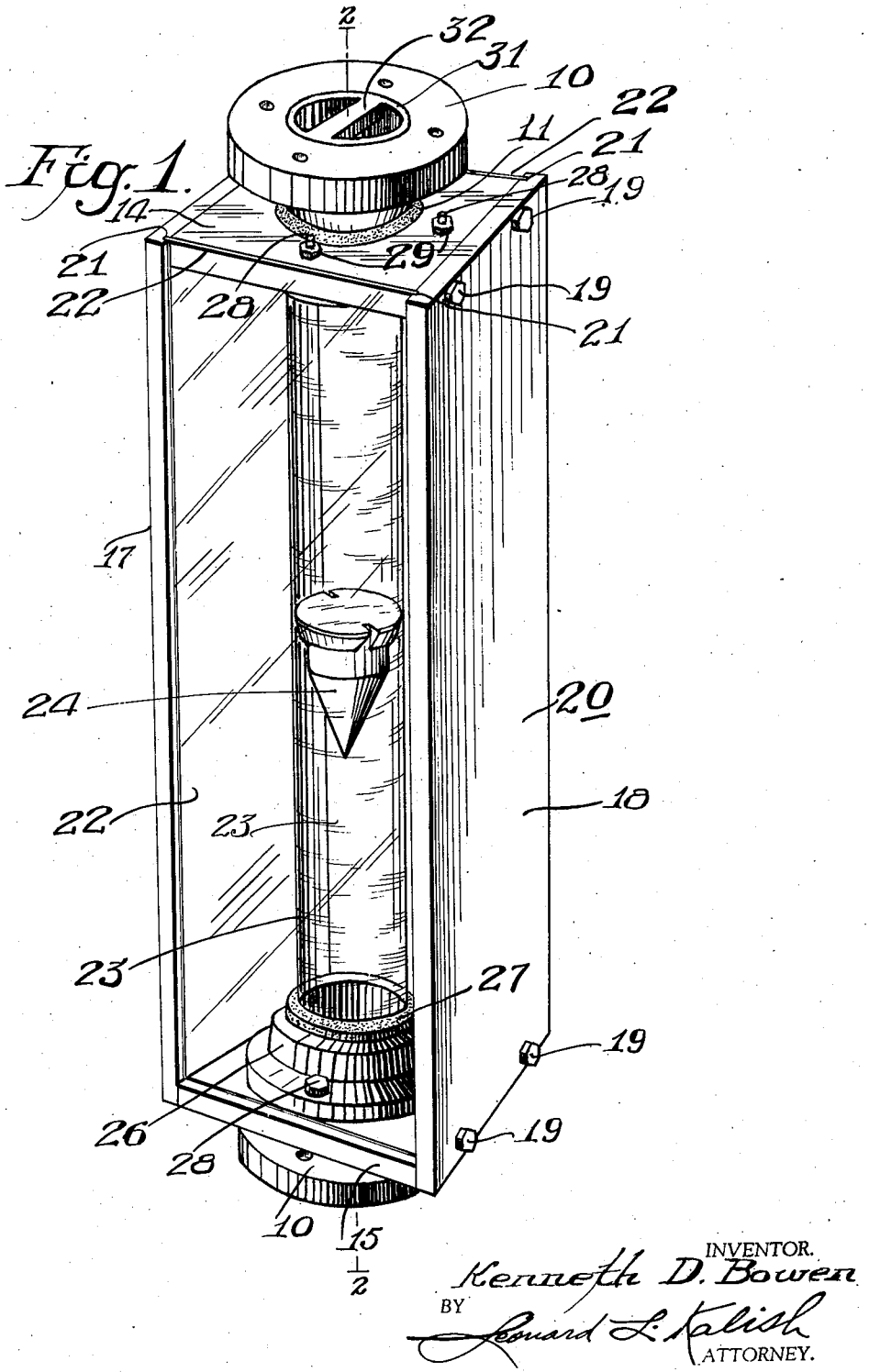
INVENTOR.
Kenneth D. Bowen
BY
Leonard L. Kalish
ATTORNEY.

Feb. 16, 1943.  K. D. BOWEN  2,311,181
ROTAMETER CONSTRUCTION
Filed Sept. 6, 1940   2 Sheets-Sheet 2
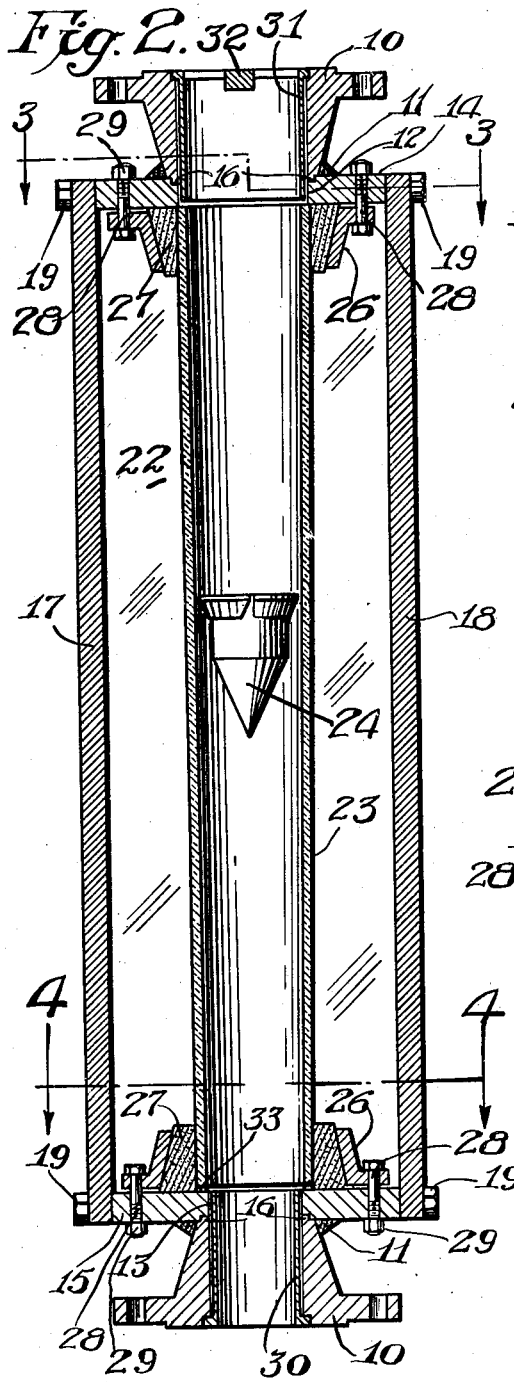
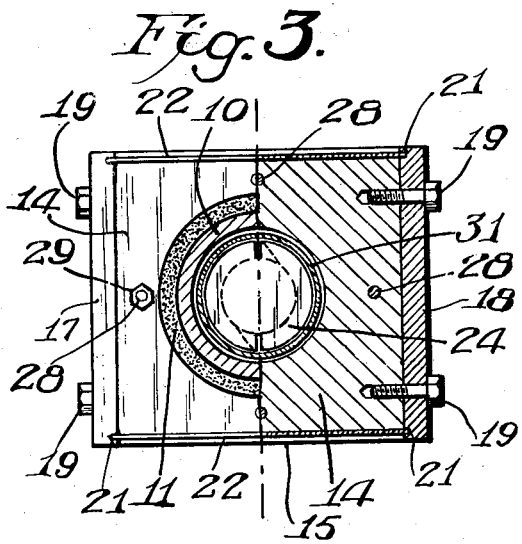
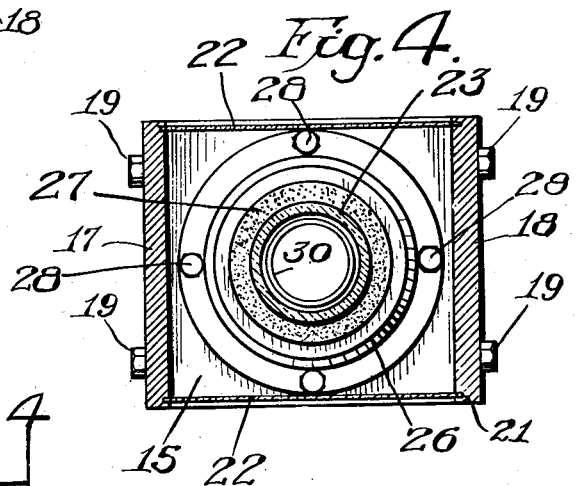
INVENTOR.
Kenneth D. Bowen
BY
Leonard L. Kalish
ATTORNEY.

Patented Feb. 16, 1943

2,311,181

UNITED STATES PATENT OFFICE 2,311,181

ROTAMETER CONSTRUCTION

Kenneth D. Bowen, Midland, Mich., assignor to The Dow Chemical Company, Midland, Mich., a corporation of Michigan Application September 6, 1940, Serial No. 355,575

5 Claims. (Cl. 73—209)

The present invention relates to certain new and useful constructions and improvements in variable-area rate of flow meters of the tube and float type which are generally referred to in the trade as "rotameters."

These rotameters are used for accurately measuring the rate of flow of various fluids, and commonly comprise an upright tapered glass metering tube, with its narrower portion lowermost, and having a free float member therein adapted to be lifted and suspended in the space inside the tube by the vertically upward flow of fluid through said tube, with the height reached by the float member indicating the concurrent rate of fluid flow.

One of the objects of the present invention is to provide a rotameter construction which will permit ready and facile removal or replacement of the float-bearing metering tube portion of the rotameter without necessitating either disconnection of the rotameter in its entirety from the line or substantially complete disassembly of the rotameter, and without requiring simultaneous removal and/or disassembly of cumbersome and bulky stuffing-box portions commonly provided at the opposite ends of the tube for sealing the end connections thereof.

Another object of the present invention is to provide a rotameter construction which thoroughly and fully protects the tapered glass metering tube against accidental breakage or injury, and at the same time safeguards the operator or passers-by against physical injury such as might otherwise be likely to follow the shattering or breakage of the glass metering tube, particularly should the break occur while the tube had been conveying fluid under extremely high pressures, or when the escaping fluid was of a dangerous character.

Another object of the present invention is to provide a durable compact and simple rotameter construction whose component parts may be readily and easily assembled and disassembled as required, and which when assembled provides a strong and sturdy construction, and which is yet inexpensive to produce.

Another object of the present invention is to provide a rotameter construction having improved packing arrangements for sealing the connections at the opposite end portions of the metering tube.

Other objects will appear more fully from the following detailed description, accompanying drawings and appended claims.

For the purpose of illustrating the invention, there is shown in the accompanying drawings a form thereof which is at present preferred, since the same has been found in practice to give satisfactory and reliable results, although it is to be understood that the various instrumentalities of which the invention consists can be variously arranged and organized and that the invention is not limited to the precise arrangement and organization of the instrumentalities as herein shown and described.

Referring now to the drawings, wherein like reference characters indicate like parts, Figure 1 represents a perspective view of a rotameter constructed in accordance with the present invention, and comprising one illustrative embodiment thereof, shown disassociated from the fluid-conducting piping which would normally lead thereto and therefrom.

Figure 2 represents a longitudinal sectional view through the rotameter taken on line 2—2 of Figure 1, looking the direction of the arrows.

Figure 3 represents a transverse sectional view taken on broken line 3—3 of Figure 2, looking in the direction of the arrows.

Figure 4 represents a lower transverse sectional view taken on line 4—4 of Figure 2, looking in the direction of the arrows.

The particular rotameter selected for illustration in the accompanying drawings includes a pair of opposite flanged pipe-fittings 10 which may be respectively annularly welded at 11, or otherwise secured in fluid-tight fashion, over the openings 12 and 13 in a pair of juxtaposed upper and lower metal end members 14 and 15 respectively—the flanged pipe fittings 10 being adapted for operative connection in the pipe line carrying the fluid flow which is to be measured. If desired, these fittings 10 may have reduced end portions 16 fitted snugly into corresponding annular recesses in their respectively adjacent end members 14 and 15, in order to insure that the parts will be in their proper relative positions during welding, and to provide a strong and tight connection therebetween.

If desired, the connection members or fittings 10 may be formed integrally with the end members 14 and 15, instead of being formed separately therefrom and connected therewith.

The end members 14 and 15 may be securely held a fixed distance apart by means of a pair of juxtaposed flat metal side plates 17 and 18, preferably of substantial width, extending intermediate the end members and securely fastened thereto by bolts 19 screw-threadedly anchored in registering tapped holes in said end members. These rigidly connected members 14, 15, 17 and 18 compositely provide a sturdy rectangular box-like structure 20 open at the front and rear.

The front and rear vertical margins of the side plates 17 and 18 may project or extend for slight distances beyond the front and rear edges of the top end member 14, all as illustrated more particularly in Figures 1 and 3, and the juxtaposed surfaces of these projecting marginal portions may be longitudinally grooved or slotted as at 21 for the reception of the vertical edge portions of a pair of transparent safety plates 22, preferably constructed of shatter-proof glass or the like. These plates 22 are vertically slidable in said grooves, and when operatively disposed therein close the open front and rear portions of the box-like structure 20 while yet permitting observation of the interior thereof.

If desired, the lower edges of these glass plates 22 may rest in grooves on the upper surface of the lower end member 15, or else they may rest directly on the upper surface of said lower end member. In the preferred embodiment, these safety glass plates 22 are preferably at least co-extensive with the front and rear openings of the box-like structure 20 when operatively disposed in the side grooves 21, thereby completely to cover or obstruct said openings in use.

If desired, only one transparent plate 22 may be provided, with the other plate being replaced by a metal panel either fixedly or movably related to the other metal plates.

Interiorly of the box-like structure is disposed an upright elongated glass metering tube 23 having a tapered bore with its narrow end lowermost. This metering tube houses a float member 24.

The tube 23 is of an overall length preferably slightly less than the distance between the members 14 and 15, and extends intermediate the openings 12 and 13 therein. Each end portion of the tube 23 may be detachably held in fluid-tight communication with its respectively adjacent opening by means of an axially adjustable annular clamping collar 26, which crowds a compressible annular sealing member 27 encircling the end of the tube 23 into intimate continuous contact with the end portion of said tube and with the metal surface surrounding the adjacent opening, thereby firmly to seal the joint therebetween and simultaneously to fix the tube end against unintended sidewise displacement relative to said opening. As shown particularly in Figs. 1 and 2, the annular sealing members 27 extend axially along the tube 23 appreciably beyond the innermost ends of the collars 26.

The clamping collar 26 may have its inner wall tapered in concave frusto-conical fashion, with its larger-diametered end being disposed nearest the adjacent end member, and this tapered inner wall of the collar may bear against a corresponding convex frusto-conically shaped outer surface on the annular sealing member 27, so that axial movement of the collar towards the adjacent end member will press the sealing member into closer contact with the tube wall while simultaneously pressing the sealing member more firmly and more snugly up against the surface surrounding the opening. This axial adjustment of the collar 26 may be effected by any suitable means, as for example by means of the illustrated clamping bolts 28, which may extend through registering openings in the clamping collar and in the adjacent end member, and on whose projecting outer end portions may be screw-threadedly mounted the retaining nuts 29.

The annular sealing members 27 are preferably made from some resilient material, the choice of which may be dictated by the character of the fluids whose rates of flow are to be determined. I have found that sealing rings constructed from "Thiokol," which is a synthetic rubber-like material, are well suited for general use. If desired, however, the sealing rings may be constructed from other materials, as for example, from "Neoprene," "Koroseal," or other synthetic or artificial rubber-like materials. Natural rubber may also be used, as may any other suitable material which may be pressed around the joints to seal the same.

If desired, the opening 13 in the lower end member 15 may be of a somewhat smaller diameter than the adjacent lower diameter of the glass metering tube 23 so that the tube may rest on said lower end member either directly or on a washer 33 disposed therebetween.

In order to limit the vertical movement of the float 24, and to prevent its entering the piping leading from or to the rotameter, upper and lower sleeve stops 30 and 31 of somewhat reduced diameters may be fitted into the end fittings 10. The upper stop 31 may include a cross-piece 32 extending diametrically across the flow passageway. If desired, however, any other suitable stop means may be provided for limiting the movements of the float member 24.

In actual operation, the fluid flows upwardly into the upwardly tapered glass metering tube 23, and upon encountering the float element 24, lifts said element vertically upwardly to the larger end of the tube establishing a passageway of gradually increasing area around the rim of the float member through which the fluid may pass. The extent to which the float rises vertically in the metering tube is proportional to the rate of fluid flow, with each particular rate of flow having a corresponding float position.

The metering tube 23, which may be constructed from "Pyrex" or other glass or from suitable transparent plastic material, may have a calibrated scale (not shown) fused, etched, or otherwise marked thereon for indicating either the vertical height of the float member, or for directly indicating the corresponding rate of flow.

When it is desired to replace the glass metering tube 23 with another tube of the same or of different size, or when it is desired to remove the tube 23 in order to gain access to the float member 24 or to clean the tube member or the float member, or for any other reason, all that need be done is first to remove one of the protective glass plates 22 by sliding it upwardly out of its retaining grooves 21 and then unscrew the retaining nuts 29, thereby loosening the clamping collar 26. The bolts 28 may then be removed and the glass metering tube 23 then bodily extracted transversely from the box structure, carrying with it the end sealing members 27 and associated collars 26. If desired, this sidewise extraction of the metering tube may be somewhat facilitated by first sliding the sealing members 27 axially along the metering tube to some slight extent before drawing said tube sidewise from the box structure.

The foregoing construction permits ready and facile removal or replacement of the metering tube without necessitating disconnection of the rotameter from the line, and without requiring any substantial disassembly of the rotameter and involves merely the removal of the bolts and nuts 28 and 29.

The surrounding box-like structure amply and fully protects the metering tube against being accidentally broken from without, while yet exposing it to view. Furthermore, if the metering tube should accidentally break due to some internal cause as for example due to an internal explosion or the like, the surrounding box-like structure 20 and the associated juxtaposed glass safety plates 22 will confine the force of the explosion and/or the fluid flow, at least temporarily, thereby avoiding possibly serious injury to persons in the immediate vicinity thereof. The hereinabove described protective structure which fully encases the metering tube 23 is of particular importance in high pressure lines or where the hazard of breakage of the tube may be unusually great, as for example in the handling of highly volatile and highly inflammable and explosive fluids, or in the handling of poisonous or dangerous fluids whose accidental escape may cause great damage.

The foregoing simple and compact rotameter construction is extremely durable and sturdy, permits ready assembly or disassembly of component elements, and yet may be produced at relatively low cost.

The present invention may be embodied in other specific forms without departing from the spirit or essential attributes thereof, and it is therefore desired that the present embodiment be considered in all respects as illustrative and not restrictive, reference being had to the appended claims rather than to the foregoing description to indicate the scope of the invention.

Having thus described my invention what is hereby claimed as new and desired to be secured by Letters Patent is:

1. A fluid flow meter including a pair of horizontal opposed upper and lower metal end members each having an opening centrally disposed therein, right and left metal side plates extending intermediate said upper and lower end members and rigidly connected therewith, front and rear side plates extending intermediate the opposed front and rear marginal portions of said right and left side plates, said members and plates compositely providing a box-like structure defining a generally completely enclosed chamber, at least one of said side plates being transparent, and at least one of said side plates being movable to provide access to the interior of said chamber, an upright tapered transparent metering tube inside said chamber having its upper and lower ends in respective communication with the openings in the upper and lower end members, said tube being of an overall length slightly less than the distance between said end members, and means detachably holding the ends of said tube in sealed communication with said openings comprising annular sealing members encircling the respective ends of said metering tube and each having a portion in operative juxtaposition with the metal surface surrounding the adjacent opening, clamping collars encircling and confining said sealing members, and adjustable screw-threaded securement means detachably holding said clamping collars to said end members.

2. A fluid flow meter, including an upright rectangular box-like structure having top and bottom end members and four side panels compositely defining a generally enclosed chamber, an opposed pair of said side panels being made of glass and at least one of the side panels being readily movable into a non-obstructing position to provide access to the interior of said structure, said top and bottom end members having aligned openings therein, a tapered, transparent metering tube of length sufficiently short to permit it to be moved sidewise between said top and bottom members, extending intermediate said aligned openings, and sealing means at each end of said tube sealing around the joints between said tube and said openings, said sealing means each being detachably associated with said structure and each comprising an annular compressible sealing member encircling an end of said tube and having a portion in operative juxtaposition with the metal surrounding the adjacent opening, and an axially adjustable clamping collar detachably connected with the adjacent end member pressing said sealing member radially inwardly into intimate sealing engagement with the tube wall and axially into intimate sealing engagement with the juxtaposed metal surrounding said adjacent opening.

3. A fluid flow meter including an upright rectangular box-like structure having top and bottom metal end members, a pair of juxtaposed metal side plates extending intermediate said upper and lower end members and securely fastened thereto, opposed front and rear marginal portions in said metal side plates bearing vertical grooves, and a pair of juxtaposed transparent front and rear plates having their vertical edge portions extending into said grooves, said transparent plates each being vertically slidably removable from said grooves to provide access to the interior of said structure, said top and bottom end members having aligned openings therein, a tapered, transparent metering tube of length sufficiently short to permit it to be moved sidewise between said top and bottom members, extending intermediate said aligned openings, and sealing means at each end of said tube sealing around the joints between said tube and said openings, said sealing means each being detachably associated with said structure and each comprising an annular compressible sealing member encircling an end of said tube and having a portion in operative juxtaposition with the metal surrounding the adjacent opening, and an axially adjustable clamping collar detachably connected with the adjacent end member pressing said sealing member radially inwardly into intimate sealing engagement with the tube wall and axially into intimate sealing engagement with the juxtaposed metal surrounding said adjacent opening.

4. A fluid flow meter comprising an upright structure including top and bottom end members having aligned openings therein and side-walls, said structure defining a generally enclosed chamber, a tapered transparent metering tube of length sufficiently short to permit it to be moved sidewise between said top and bottom end members extending intermediate said aligned openings, means forming part of said structure and permitting opening thereof for sidewise removal of said tube, and sealing means at each end of said tube for peripherally sealing the joints between said tube and said openings, said sealing means each including an annular compressible sealing member encircling an end of said tube and having a portion in operative juxtaposition with the surface surrounding the adjacent opening, an axially adjustable clamping collar detachably connected with the adjacent end member pressing said sealing member radially inwardly into intimate sealing engagement with the tube wall and axially into intimate sealing engagement with the juxtaposed surface surrounding said adjacent opening, and screw-threaded means extending through said end member and operable from outside of said structure for axially adjusting said clamping collar.

5. A fluid flow meter of the character described including metal end members in spaced relationship to each other and having aligned openings therein, a transparent tapered metering tube of overall length slightly less than the distance between said end members and having its ends in operative juxtaposition with the openings in said end members and generally perpendicular thereto, annular pliable sealing elements encircling said ends and having portions in operative juxtaposition with said end members, annular collars having frusto-conical inner surfaces encircling said pliable sealing elements and adapted to force said sealing elements against said end members, and adjustable means detachably holding said collars to said end members, said collars being spaced substantially apart from the adjacent portions of said metering tube, said sealing elements extending axially inwardly along said metering tube from said end members substantially beyond the innermost ends of said collars, said collars exerting pressure upon said sealing elements only along the frusto-conical inner surfaces thereof.

KENNETH D. BOWEN.